2,945,906

CRACKING OF OLIGOMERS OF ISOBUTENE IN THE PRESENCE OF SILICA-MAGNESIA CATALYSTS

Hugo Kroeper, Heidelberg, and Rolf Platz, Mannheim, Germany, assignors to Badische Anilin- & Soda-Fabrik Aktiengesellschaft, Ludwigshafen (Rhine), Germany No Drawing. Filed Oct. 8, 1956, Ser. No. 614,354

Claims priority, application Germany Oct. 15, 1955

6 Claims. (Cl. 260—683)

This invention relates to a process for cracking oligomers of isobutene. In particular it relates to an improvement in the industrial execution of the cracking process by the use of a new cracking catalyst.

It is already known to depolymerize lower polymers of isobutene, as for example di-, tri- or tetra-isobutene, to monomeric isobutene. It is a special technical importance to carry out the cracking so that the cracked product contains in the $C_4$-fraction almost pure isobutene and is free from normal-butenes. This is of decisive value for the further working up, for example for the production of synthetic rubber, because otherwise a premature breaking of the chain takes place, and no high molecular substances with a molecular weight of 10,000 or even 100,000 or 200,000 and more are formed. In particular it is therefore necessary to exclude isomeration reactions during the cracking of the isobutene and above all to avoid a rearrangement of isobutene to normal-butene-(1), because the separation of this substance from isobutene is especially difficult.

Of the great number of catalysts hitherto used for the cracking of oligomers of isobutene, all of which are more or less attended by isomerizing action, the best, apart from kieselguhr impregnated with phosphoric acid, has been naturally-occurring fuller's earth, in particular attapulgite (see Ind. and Eng. Chem. 40 (1948), 2091 et seq.). It is true that these catalysts give a substantially pure isobutene with good yields of cracked products, but attapulgit, with its chalky properties, has only slight solidity so that the catalyst must frequently be renewed by reason of its high attrition, and this leads to disturbances and interruptions in the operation. In particular it hardly comes into consideration for operation with moving bed catalysts or with catalysts held in suspended condition (fluidized bed catalysts).

We have now found that almost pure isobutene can also be obtained with equally good yields without the said disadvantages by using as catalyst a synthetically-prepared magnesium silicate the content of which is magnesium, calculated as magnesium oxide, amounts to 1 to 20% by weight, advantageously 5 to 10% by weight, with reference to the prepared catalyst.

The production of the catalysts may take place by known mehods, as for example by thermal treatment of silicic acid and magnesium compounds, such as magnesium oxide, hydroxide, carbonate or oxalate, and the silica and the magnesium compound may be obtained by common precipitation from their soluble compounds. It is especially preferable to impregnate silica, in particular shaped silicic acid strings, with magnesium salts which decompose when heated. The nitrate of magnesium is especially suitable for this purpose. The silica to which magnesium compounds have been added in one way or another is then heated to temperatures between about 500° and 900° C., in particular 600° to 750° C., the formation of magnesium silicate thereby taking place, in the case of the use of magnesium nitrate with decomposition of the nitrate. The amount of magnesium compound which is mixed with the silicic acid or added thereto in some other way must be measured so that the prepared catalysts have a content of 1 to 20% by weight of magnesium, calculated as magnesium oxide.

The new catalysts yield a cracked product from polymers of isobutene which when separated gives a $C_4$-fraction which is practically pure isobutene. In particular this fraction is free from the difficultly separable butene-(1). Moreover these catalysts permit an increase in the throughput, especially when the magnesium content calculated as magnesium oxide lies above 5% by weight. It is advantageous to choose a ratio of $SiO_2$:MgO of between 99:1 and 80:20, in particular 90:10. The throughput with the said catalysts may amount with a rigid arrangement of the catalyst to 1 litre of the isobutylene oligomers per kilogram of catalyst per hour and with a moving catalyst to 10 litres per kilogram of catalyst per hour.

In the depolymerization of the oligomers of isobutene di-isobutene is especially suitable as initial material for the process according to this invention, but tri- or tetra-isobutene may also be used. The reaction can be effected in liquid or gaseous phase under the known conditions, and the catalysts may be rigidly arranged or moving. The most favorable cracking temperatures lie between about 200° and 550° C., advantageously between about 280° and 450° C. The most preferable temperatures vary somewhat depending on the initial oligomer of isobutene. The most favorable temperature may readily be ascertained in each case by preliminary test. When working in the liquid phase, the use of increased pressure may be necessary. In general working is in the vapor phase at atmospheric pressure, but reduced pressures, as for example of 0.01 to 0.5 atmosphere, can sometimes be used with advantage. It is especially preferable to carry out the cracking of the oligomers of isobutene with a catalyst having a grain size of between 0.05 and 0.6 millimeter, preferably between 0.1 and 0.3 millimeter, the catalyst being kept in motion by the vaporous or gaseous products either in the way of a boiling liquid or by being carried upwards through the reaction zone to be discharged overhead and refed into the catalyst zone in a cyclic fashion.

It is not necessary to lead the oligomers of isobutene in the vapor phase into the reaction vessel as such. Usually it is even preferable to dilute them with inert gases, as for example nitrogen, carbon dioxide, methane, ethane or propane. It is especially advantageous to use mixtures which contain for example 10 to 90% by volume of the oligomers of isobutene besides the inert gas.

The fraction which has not been depolymerized and the $C_4$-fraction are separated from the cracked product by known methods, as for example by fractional condensation.

When the cracking activity of the catalyst subsides, the spent catalyst can be reactivated by burning off with air the resinous impurities deposited thereon.

The following examples will further illustrate this invention but the invention is not restricted to these examples.

Example 1

4 kilograms of silicic acid strings are treated at room temperature with an aqueous solution of 2.83 kilograms of magnesium nitrate containing water of crystallization $(MgNO_3)_2.6H_2O$ in 38 litres of water and, after separation of the liquid, dried at 100° C. The catalyst is then heated for 2 hours at 700° C. and then allowed to cool slowly. The ratio of silicic acid to magnesium, calculated as magnesium oxide, in the finished catalyst is about 9:1. The weight of a litre thereof is 550 grams. 100 grams of the catalyst are capable of absorbing about 72 grams of water.

150 cc. of the resultant catalyst which have been brought to a grain size of 0.1 to 0.3 millimeter are arranged on a sieve plate in a reaction vessel 350 millimeters in length and 60 millimeters in width. The vessel is heated to about 400° C. by external heating and a gas current, preheated to 400° C., of 10.7 grams of di-isobutene and 2 litres of nitrogen (measured under normal conditions) are led per minute into the vessel beneath the sieve plate.

The gas leaving the reaction vessel is fractionally condensed by leading it first through a receiver cooled with ice and then through a receiver cooled with solid carbon dioxide in methanol. 45% of unreacted di-isobutene are retained in the ice-cooled receiver while in the trap cooled with carbon dioxide 41.1% of the di-isobutene introduced are retained as an isobutene fraction. 13.9% are lost.

Samples of the isobutene fraction are taken at intervals and these contain, besides isobutene, the following impurities on the basis of the spectrum in an infra-red spectrometer:

| Time in minutes after the beginning of the reaction at which the sample is withdrawn | Butene-(1) in percent by weight (analytical limits of error ±0.5%) | Butene-(2) in percent by weight (analytical limits of error ±0.3%) | |
|---|---|---|---|
| | | cis | trans |
| 20 | 0 | 0.4 | 0.4 |
| 40 | 0 | 0.3 | 0.3 |
| 60 | 0 | 0.3 | 0.3 |
| 75 | 0 | 0.3 | 0.3 |

Even after 24 hours the cracking catalyst shows undiminished cracking activity.

After distillation of the isobutene, the fraction from −6.9° C. to −3° C. gave by polymerization in liquid ethylene in the presence of boron trifluoride and isobutanol a polyisobutene having a molecular weight of 226,000.

*Example 2*

The cracking of di-isobutene is carried out in the manner described in Example 1 under the same conditions, the catalysts used having different magnesium contents, calculated as MgO. The MgO percentage of synthetically made magnesium silicate used and the extent of the conversion after a single pass of the initial materials is shown in the following table:

| Content of MgO in the catalyst in percent by weight | Conversion in percent by weight | Content of isobutene in the reacted di-isobutene in percent by weight |
|---|---|---|
| 2.71 | 44 | 99 |
| 5.27 | 47 | 99 |
| 10.00 | 59 | 99 |
| 18.20 | 72.5 | 98.5 |

No butene-(1) could be detected in the isobutene obtained with an infra-red spectrometer.

The catalysts used exhibited their full cracking activity even after uninterrupted operation for 30 days.

What we claim is:

1. A process for the production of isobutene which is essentially free of normal-butenes by cracking oligomers of isobutene at elevated temperature in the presence of a catalyst which comprises subjecting a composition including a depolymerizable hydrocarbon consisting essentially of an oligomer of isobutene selected from the group consisting of diisobutene, triisobutene and tetraisobutene to a heat treatment at a temperature between 200° C. and 550° C. in the presence of a synthetic silica-magnesia catalyst, the said catalyst containing from 1 to 20% by weight of magnesium expressed as magnesium expressed as magnesium oxide, said percentage with reference to the total weight of the catalyst.

2. The process for the production of isobutene which is essentially free of normal-butenes from diisobutene which comprises subjecting a composition including a depolymerizable hydrobaron consisting essentially of diisobutene to a heat treatment at a temperature of from 200° to 550° C. in the presence of a cracking catalyst consisting of a synthetic silica-magnesia catalyst, the said catalyst containing from 1 to 20% by weight of magnesium expressed as magnesium oxide, said percentage with reference to the total weight of the catalyst.

3. The process as claimed in claim 2, wherein the di-isobutene is in the vapor form.

4. The process as claimed in claim 2, wherein the di-isobutene is diluted with an inert gas.

5. The process as claimed in claim 2, wherein the high-temperature treatment of the oligomers of isobutene is carried out by the fluidized layer method.

6. The process as claimed in claim 2, wherein the catalyst used has a grain size of from 0.05 to 0.6 millimeter.

References Cited in the file of this patent
UNITED STATES PATENTS

| | | |
|---|---|---|
| 2,196,363 | Robertson | Apr. 9, 1940 |
| 2,399,261 | Thomas | Apr. 30, 1946 |
| 2,498,840 | Johnson | Feb. 28, 1950 |
| 2,760,939 | Herder | Aug. 28, 1956 |

UNITED STATES PATENT OFFICE
CERTIFICATE OF CORRECTION

Patent No. 2,945,906　　　　　　　　　　　　　　　　July 19, 1960

Hugo Kroeper et al.

It is hereby certified that error appears in the printed specification of the above numbered patent requiring correction and that the said Letters Patent should read as corrected below.

Column 4, line 16, strike out "as magnesium expressed".

Signed and sealed this 10th day of January 1961.

(SEAL)
Attest:

KARL H. AXLINE
Attesting Officer

ROBERT C. WATSON
Commissioner of Patents